United States Patent
Matsuo

(10) Patent No.: US 9,847,097 B2
(45) Date of Patent: Dec. 19, 2017

(54) AUDIO SIGNAL PROCESSING DEVICE, AUDIO SIGNAL PROCESSING METHOD, AND RECORDING MEDIUM STORING A PROGRAM

(71) Applicant: FUJITSU LIMITED, Kawasaki-shi, Kanagawa (JP)

(72) Inventor: Naoshi Matsuo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/242,681

(22) Filed: Aug. 22, 2016

(65) Prior Publication Data
US 2017/0092299 A1 Mar. 30, 2017

(30) Foreign Application Priority Data
Sep. 28, 2015 (JP) .................................. 2015-190254

(51) Int. Cl.
G10L 15/20 (2006.01)
G10L 25/93 (2013.01)
G10L 21/0216 (2013.01)
G10L 15/02 (2006.01)
(Continued)

(52) U.S. Cl.
CPC .............. G10L 25/93 (2013.01); G10L 15/20 (2013.01); G10L 21/0216 (2013.01); G10L 15/02 (2013.01); G10L 25/78 (2013.01); G10L 25/87 (2013.01); G10L 2021/02165 (2013.01); G10L 2021/02168 (2013.01)

(58) Field of Classification Search
CPC ....... G10L 15/22; G10L 15/30; G10L 15/265; G10L 15/20; G10L 15/07; G10L 15/02; G10L 25/78; G10L 25/87; G10L 25/69; G10L 19/005; G10L 19/012; G10L 21/0208; G10L 21/0232; G10L 21/0272
USPC .......................... 704/226, 227, 228, 231, 233
See application file for complete search history.

(56) References Cited

U.S. PATENT DOCUMENTS

2007/0274536 A1 11/2007 Matsuo
2011/0288860 A1 11/2011 Schevciw et al.
(Continued)

FOREIGN PATENT DOCUMENTS

| EP | 2265039 A1 | 12/2010 |
|---|---|---|
| JP | 2007-318528 | 12/2007 |
| JP | 2010-232717 | 10/2010 |

(Continued)

OTHER PUBLICATIONS

Extended European Search Report dated Feb. 24, 2017 for corresponding to European Patent Application No. 16185469.0, 7 pages.

*Primary Examiner* — Vu B Hang
(74) *Attorney, Agent, or Firm* — Fujitsu Patent Center

(57) ABSTRACT

An audio signal processing device that includes: a processor configured to execute a procedure, the procedure comprising: detecting a speech segment of an audio signal; suppressing noise in the audio signal; and adjusting an amount of suppression of noise such that the amount of suppression during a specific period, which starts from a position based on a terminal end of the detected speech segment and is a period shorter than a period spanning from the terminal end of the detected speech segment to a starting end of a next speech segment, becomes greater than in other segments, and a memory configured to store audio signals before and after noise suppression and the amount of suppression before and after adjustment.

12 Claims, 10 Drawing Sheets

(51) Int. Cl.
   *G10L 25/78* (2013.01)
   *G10L 25/87* (2013.01)

(56) References Cited

U.S. PATENT DOCUMENTS

2011/0313763  A1    12/2011   Amada
2015/0294674  A1    10/2015   Takahashi

FOREIGN PATENT DOCUMENTS

JP    2011-099967    5/2011
JP    2014-075674    4/2014

AUDIO SIGNAL PROCESSING DEVICE, AUDIO SIGNAL PROCESSING METHOD, AND RECORDING MEDIUM STORING A PROGRAM

CROSS-REFERENCE TO RELATED APPLICATION

This application is based upon and claims the benefit of priority of the prior Japanese Patent Application No. 2015-190254, filed on Sep. 28, 2015, the entire contents of which are incorporated herein by reference.

FIELD

The embodiments discussed herein are related to an audio signal processing device, an audio signal processing method, and a recording medium storing a program.

BACKGROUND

Audio has increasingly been used as a user interface for electronic devices. When using audio as a user interface for an electronic device, speech is generally recognized by an application that performs speech recognition. Noise suppression is performed on the audio input to the application in order to increase the speech recognition rate of the application that performs speech recognition. For example, technology exists to detect sound source directions in each band on the frequency axis, and to suppress noise in cases in which the sound source direction is in a noise suppression range.

Related Patent Documents

Japanese Patent Application Laid-Open (JP-A) No. 2007-318528

SUMMARY

According to an aspect of the embodiments, an audio signal processing device includes a processor configured to execute a procedure. The procedure includes detecting a speech segment of an audio signal, suppressing noise in the audio signal, and adjusting an amount of suppression of noise such that the amount of suppression during a specific period, which starts from a position based on a terminal end of the detected speech segment and is a period shorter than a period spanning from the terminal end of the detected speech segment to a starting end of the next speech segment, becomes greater than in other segments. The audio signal processing device further includes a memory configured to store audio signals before and after noise suppression and the amount of suppression before and after adjustment.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

First Exemplary Embodiment

Detailed explanation follows regarding a first embodiment, which is an example of an embodiment, with reference to the drawings.

Figure 1:
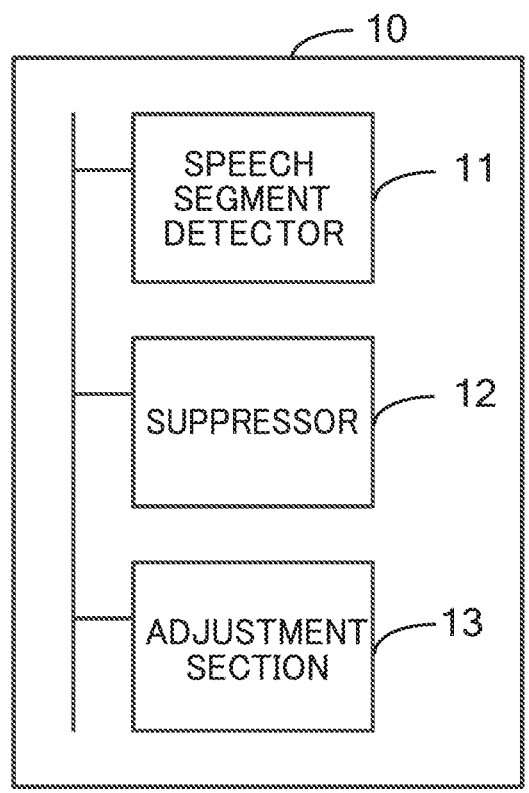
FIG. 1 is a block diagram illustrating examples of relevant functionality of an audio signal processing device according to a first to a fourth exemplary embodiment.

An audio signal processing device 10 illustrated in FIG. 1 includes a speech segment detector 11, a suppressor 12, and an adjustment section 13. The speech segment detector 11 detects speech segments of an audio signal. The suppressor 12 suppresses noise in the audio signal. The adjustment section 13 adjusts an amount of suppression by the suppressor 12 such that the amount of suppression by the suppressor 12 during a specific period, which starts from a position based on a terminal end of a speech segment detected by the speech segment detector 11 and is a period shorter than a period spanning from the terminal end of the speech segment detected by the speech segment detector 11 to a starting end of the next speech segment, becomes greater than in other segments.

Figure 2:
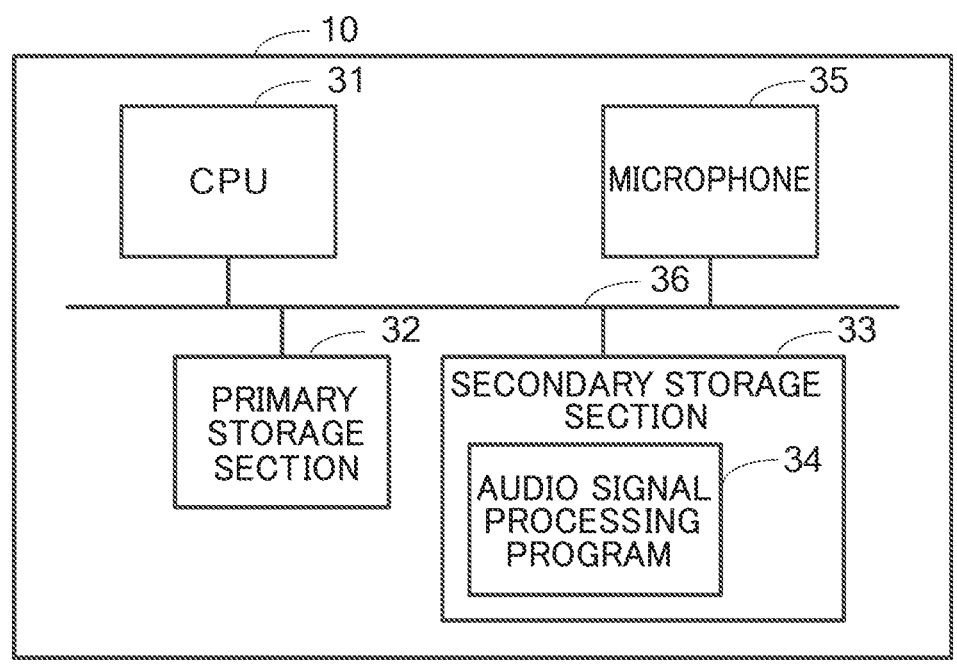
FIG. 2 is a block diagram illustrating an example of electrical configuration of an audio signal processing device according to the first to the third exemplary embodiment.

As illustrated in FIG. 2, the audio signal processing device 10, as an example, includes a central processing unit (CPU) 31, which is an example of a processor, a primary storage section 32, a secondary storage section 33, and a microphone 35. The CPU 31, the primary storage section 32, the secondary storage section 33, and the microphone 35 are connected to one another through a bus 36. Note that the microphone 35 may be an external microphone connected to the audio signal processing device 10 through a microphone terminal or the like.

The primary storage section 32 is volatile memory such as random access memory (RAM). The secondary storage section 33 is non-volatile memory such as a hard disk drive (HDD) or a solid state drive (SSD).

As an example, the secondary storage section 33 stores an audio signal processing program 34. The CPU 31 reads the audio signal processing program 34 from the secondary storage section 33 and expands the audio signal processing program 34 into the primary storage section 32. The CPU 31 operates as the speech segment detector 11, the suppressor 12, and the adjustment section 13 of FIG. 1 by executing the audio signal processing program 34. Note that the audio signal processing program 34 may be stored on an external server and expanded into the primary storage section 32 via a network, or may be stored on a non-transient recording medium such as a DVD and expanded into the primary storage section 32 via a recording medium reading device.

The microphone 35 picks up audio, and converts the audio into an audio signal. Note that the audio signal processing device 10 may be, for example, a personal computer, a tablet, a smartphone, a cellular phone, a dedicated audio signal processing device, or an audio signal processing device for a vehicle installed electronic device.

Figure 3:
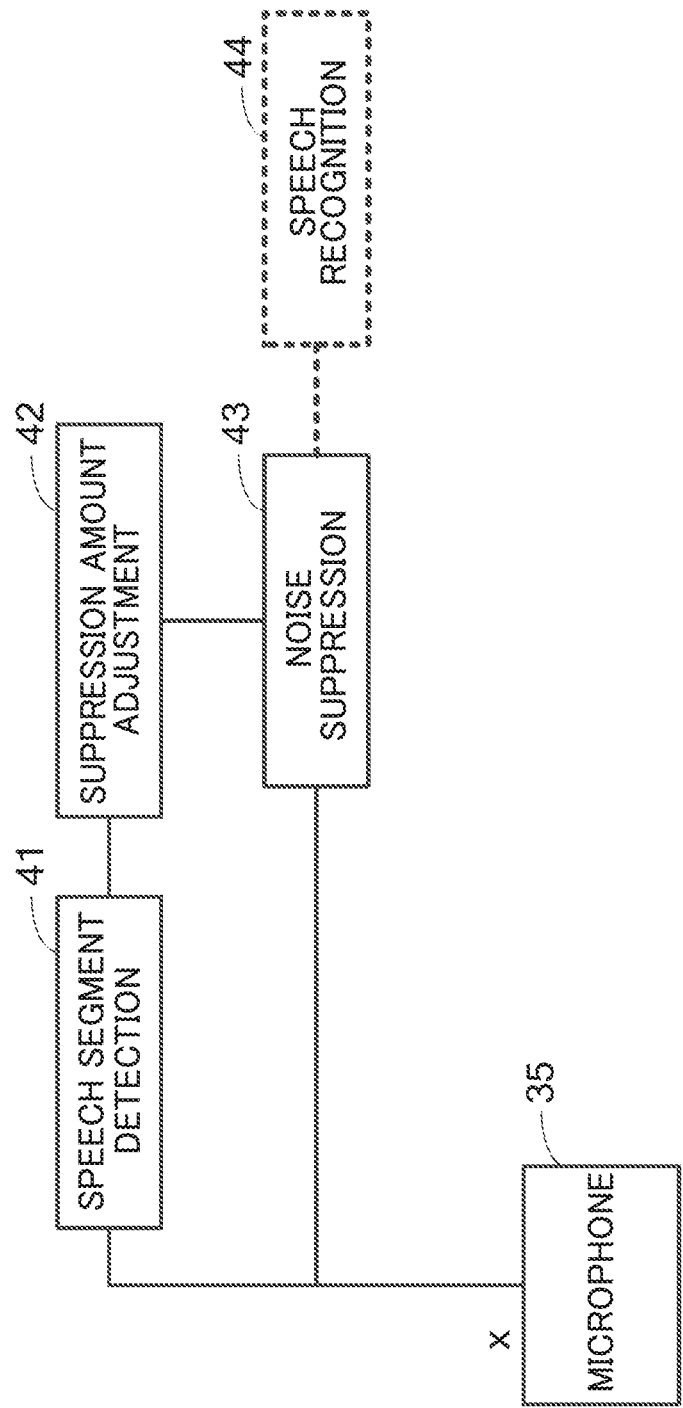
FIG. 3 is an illustrative diagram for explaining an example of audio signal processing according to the first to the third exemplary embodiment.

Next, explanation follows regarding an outline of operation of the audio signal processing device 10. In the present exemplary embodiment, as illustrated in FIG. 3, in block 43, the CPU 31 suppresses noise in an audio signal x that corresponds to audio picked up by the microphone 35. The noise suppression may, for example, employ existing noise suppression technology such as noise suppression by filtering or noise suppression by spectral restoration.

Figure 4:
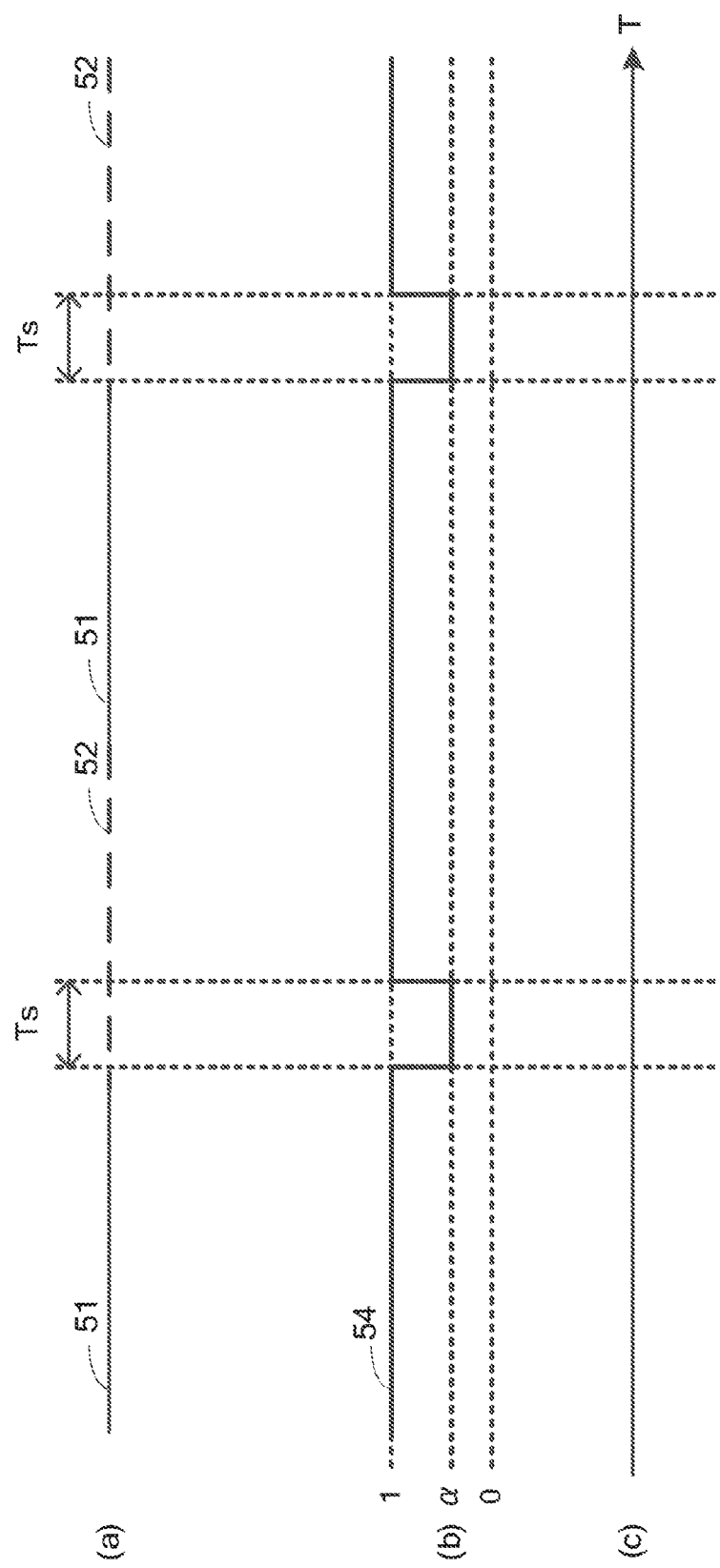
FIG. 4 is an illustrative diagram for explaining increased-suppression segments and suppression gain of the audio signal processing according to the first to the fourth exemplary embodiment.

In block 41, the CPU 31 detects speech segments of the audio signal picked up by the microphone 35. The speech segment detection may employ existing audio segment detection technology. The solid lines of graph (a) in FIG. 4 illustrate speech segments 51 spoken by a user, and the dashed lines illustrate non-speech segments 52 between one speech segment 51 and another speech segment 51. The non-speech segments 52 are segments that include background noise. The horizontal axis (c) of FIG. 4 represents passage of time T.

In block 42, the CPU 31 controls such that the amount of suppression of noise in the audio signal performed in block 43 during specific periods Ts starting from positions based on terminal ends of speech segments 51, is greater than the amount of suppression performed in segments other than the specific periods Ts. Hereafter, the specific periods Ts are also referred to as increased-suppression-amount segments Ts. The increased-suppression-amount segments Ts are periods shorter than a period spanning from the terminal end of a speech segment 51 to the starting end of the next speech segment 51.

The CPU 31 transmits an audio signal in which noise has been suppressed to block 44 (also referred to as a speech recognition block 44 hereafter) so that speech recognition processing is performed on an audio signal in which noise has been suppressed.

Figure 5:
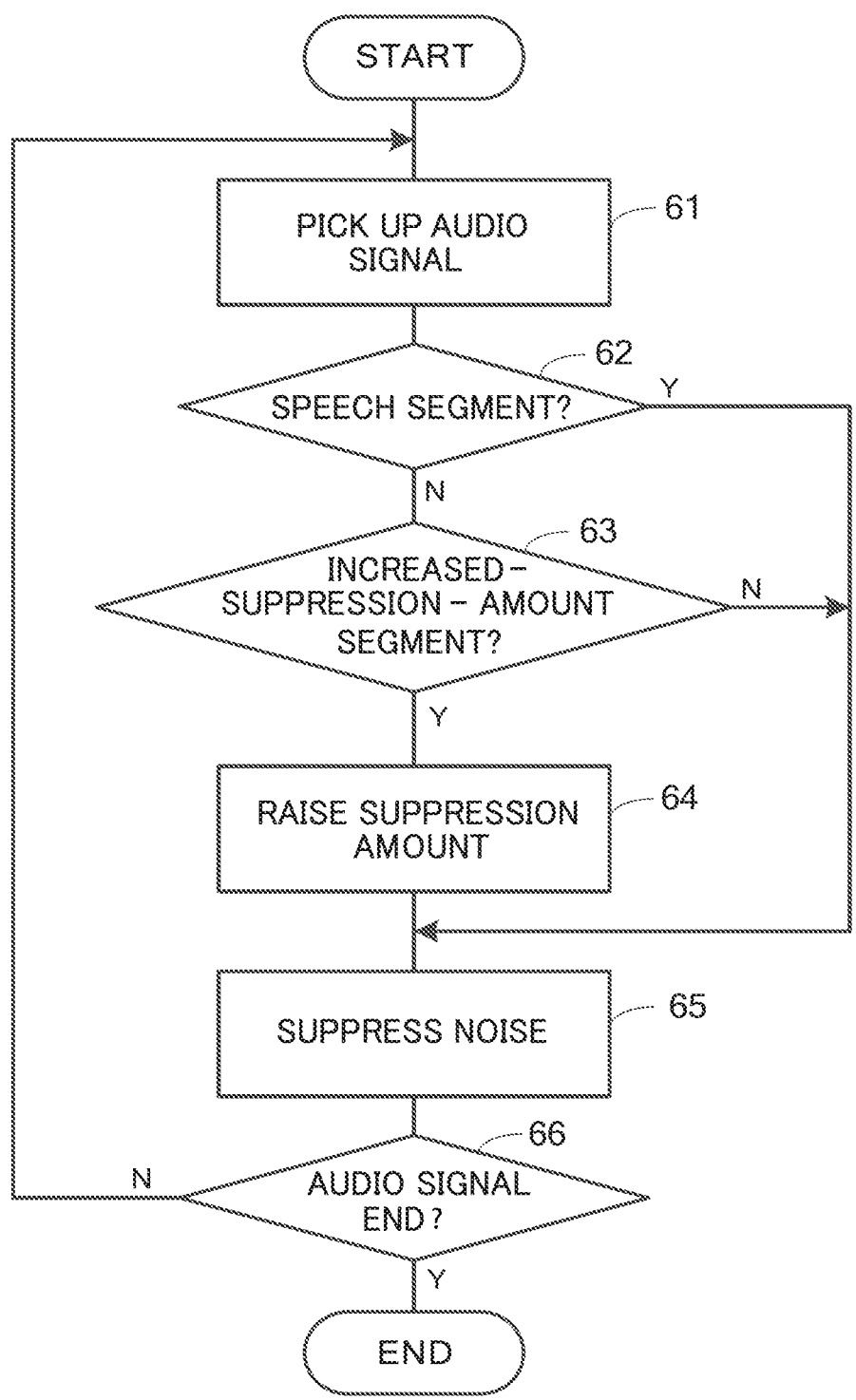
FIG. 5 is a flowchart illustrating an example of a flow of audio signal processing according to the first and the fourth exemplary embodiment.

In more detail, as illustrated by the example in FIG. 5, at step 61, the CPU 31 picks up, for example, one frame worth of the audio signal x corresponding to the audio picked up by the microphone 35. At step 62, the CPU 31 determines whether or not the picked up audio signal x is an audio signal of a speech segment 51.

In this example, the power P of the audio signal x is calculated using Equation (1), and determination of a speech segment is made in cases in which the power of the audio signal x is a specific value or above.

$$P = \Sigma x(t)^2 \quad (1)$$

In Equation (1), x(t) denotes an audio signal at a time t (t=Tfi (i=1, . . . , n; and n denotes the number of signal frame partitions and Tf1 to Tfn represents a time length of one signal frame)).

In cases in which affirmative determination is made at step 62, at step 65, the CPU 31 suppresses noise in the audio signal x. (Note that, as described below, in cases in which negative determination is made at step 62, the CPU 31 still suppresses noise in the audio signal x at step 65, but after having executed other steps.)

For example, for additive noise, audio signals x(t) including noise, audio signals s(t) that do not include noise, and noise signals n(t) have the relationship indicated by Equation (2).

$$x(t) = s(t) + n(t) \quad (2)$$

When Equation (2) is considered in the frequency domain, the audio signal spectrum $X(\omega)$ including noise, the audio signal spectrum $S(\omega)$ that does not include noise, and the noise signal spectrum $N(\omega)$ have the relationship indicated by Equation (3).

$$X(\omega) = S(\omega) + N(\omega) \quad (3)$$

Where $\omega$ denotes frequency.

For example, in noise suppression by filtering, as indicated by the example of Equation (4), an audio signal spectrum $S'(\omega)$ in noise is suppressed (also referred to as a noise suppressed signal spectrum $S'(\omega)$ hereafter) can be acquired by multiplying the audio signal spectrum $X(\omega)$ including noise by a gain $G(\omega)$ that is a filter.

$$S'(\omega) = G(\omega) X(\omega) \quad (4)$$

In cases in which negative determination has been made at step 62, at step 63, the CPU 31 determines whether or not the picked up audio signal x is an audio signal x of an increased-suppression-amount segment Ts. In more detail, determination is made as to whether or not the picked up audio signal x is an audio signal x from during a specific period Ts starting from a position based on the terminal end of a speech segment 51. The position based on the terminal end of the speech segment 51 may, for example, be a position included within a range spanning from the terminal end of the speech segment 51 to from 0 seconds to several hundred milliseconds onward. Moreover, the increased-suppression-amount segment Ts may, for example, be a period of several hundred milliseconds.

In cases in which negative determination has been made at step 63, namely, in cases in which it has been determined that the audio signal x is not an audio signal x of an increased-suppression-amount segment Ts, noise in the audio signal x is suppressed at step 65.

In cases in which affirmative determination has been made at step 63, namely, in cases in which it has been determined that the audio signal x is an audio signal x of an increased-suppression-amount segment Ts, at step 64, the CPU 31 increases the amount of suppression of noise performed at step 65.

In Equation (4), the closer the gain $G(\omega)$ is to 1, the lower the amount of suppression $(X(\omega) - G(\omega) X(\omega))$, this being the difference between the noise suppressed signal spectrum $S'(\omega)$ and the audio signal spectrum $X(\omega)$ including noise. On the other hand, the closer the value of the gain $G(\omega)$ is to 0, the greater the amount of suppression $(X(\omega) - G(\omega) X(\omega))$, this being the difference between the noise suppressed signal spectrum $S'(\omega)$ and the audio signal spectrum $X(\omega)$. Accordingly, for example, as indicated by the solid line 54 of graph (b) of FIG. 4, the amount of suppression is increased here for the duration of the increased-suppression-amount segment Ts by multiplying the gain $G(\omega)$ by a suppression gain $\alpha$ $(0 < \alpha < 1)$.

At step 65, the CPU 31 suppresses noise in the audio signal x using the amount of suppression that was increased at step 64. Namely, the noise in the audio signal x is more strongly suppressed during the increased-suppression-amount segment Ts than in other segments.

At step 66, the CPU 31 determines whether or not processing has completed for all of the audio signal x. The CPU 31 returns to step 61 in cases in which negative determination has been made at step 66. The CPU 31 ends the audio signal processing in cases in which affirmative determination has been made at step 66.

Although explanation has been given above using noise suppression by filtering, the present exemplary embodiment is not limited thereto. For example, existing noise suppression technology such as noise suppression by spectral restoration or model-based audio noise suppression may be employed. Similar applies to the other exemplary embodiments explained below.

In the present exemplary embodiment, speech segments 51 of the audio signals x are detected, and noise in the audio signals x is suppressed. In the present exemplary embodiment, the amount of suppression is adjusted such that the amount of suppression during the specific period Ts, which starts from the position based on the terminal end of the detected speech segment 51 and is a period shorter than a period spanning from the terminal end of the detected speech segment 51 to the starting end of the next speech segment 51, is greater than in other segments.

As explained above, in the present exemplary embodiment, noise is suppressed over the entire audio signal x, but the amount of suppression is increased in the increased-suppression-amount segments Ts rather than over the entire audio signal x. This prevents distortion from arising in the audio signal x due to the amount of suppression being increased excessively in the present exemplary embodiment. Namely, the recognition rate of the speech recognition block 44 at a later stage can be prevented from being decreased by distortion arising in the audio signal x.

Moreover, in the present exemplary embodiment, the recognition rate of the speech recognition block 44 at a later stage can be prevented from being decreased due to the amount of suppression for suppressing noise not being high over the entire audio signal x. The power of speech by a user generally decreases as the terminal end of the speech is approached. Moreover, background noise is still present in the non-speech segments 52, making it difficult to recognize terminal ends of speech, these being boundaries between speech segments 51 and non-speech segments 52.

If the amount of suppression here for suppressing noise in the audio signal x is not high, namely, is insufficient, then the difference between audio signals x in the speech segments 51 and audio signals x that are background noise in non-speech segments 52 becomes unclear due to residual noise. This makes it more difficult for the speech recognition block 44 to recognize terminal ends of speech, and lowers the speech recognition rate of the speech recognition block 44. According to the present exemplary embodiment, the recognition rate of the speech recognition block 44 can be prevented from being decreased since recognition of terminal ends of speech by the speech recognition block 44 is facilitated by increasing the amount of suppression for the increased-suppression-amount segments Ts.

There is an issue in that excessively suppressing noise gives rise to distortion in the audio, lowering the recognition rate of speech recognition at a later stage, and insufficient suppression of noise results in speech segments, which are segments in which a user speaks, not being appropriately detected, lowering the recognition rate of speech recognition at a later stage.

In consideration of these particulars, the present disclosure enables noise to be suppressed in audio such that terminal ends of speech segments of audio can be appropriately determined.

Second Exemplary Embodiment

Next, explanation follows regarding a second embodiment, which is an example of an embodiment. Explanation regarding configuration and operation similar to that of the first exemplary embodiment is omitted.

Figure 6:
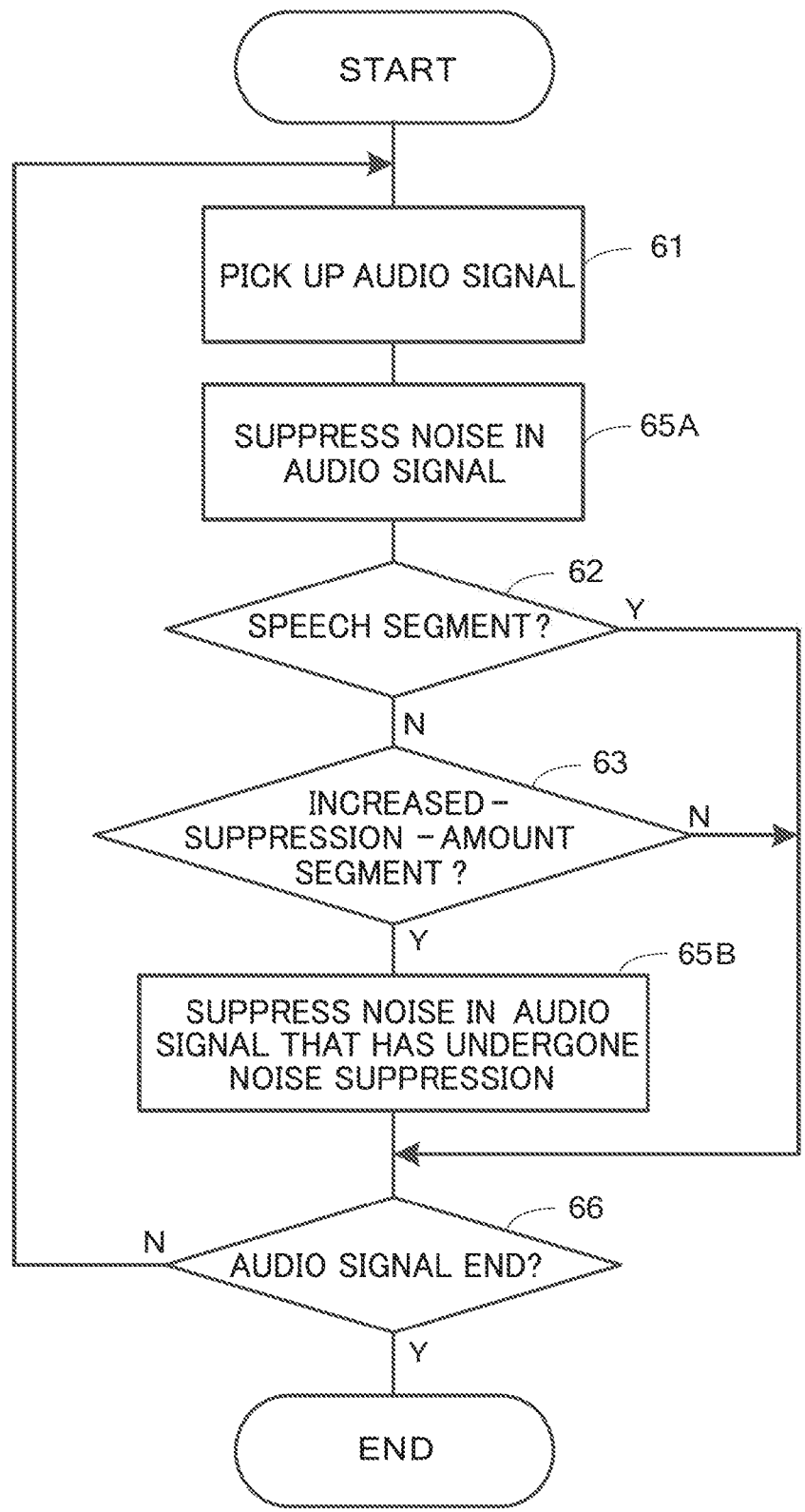
FIG. 6 is a flowchart illustrating an example of a flow of audio signal processing according to the second exemplary embodiment.

In the present exemplary embodiment, as illustrated by the example of FIG. 6, before detection of the speech segments at step 62, at step 65A, the CPU 31 suppresses noise in the audio signal x picked up at step 61. In cases in which affirmative determination has been made at step 63, namely, cases in which it has been determined that the audio signal x is an increased-suppression-amount segment Ts, at step 65B, the CPU 31 further suppresses noise in the audio signal x by multiplying an audio signal s" that has undergone noise suppression at step 65A (also referred to as a noise suppressed signal s" hereafter) by the suppression gain α.

Namely, in the first exemplary embodiment, noise suppression is performed on the audio signal x using gain G outside of increased-suppression-amount segments Ts, and noise suppression is performed by multiplying the suppression gain α by the gain G in the increased-suppression-amount segments Ts. In contrast thereto, in the second exemplary embodiment, first, noise suppression is performed by first using gain G across the entire audio signal x, and then the noise suppressed signal s" is multiplied by the suppression gain α in increased-suppression-amount segments Ts. The amount of suppression of noise is increased in the increased-suppression-amount segments Ts by multiplying the noise suppressed signal s" by the suppression gain α.

In the present exemplary embodiment, noise is suppressed in the audio signal x. In the present exemplary embodiment, the amount of suppression is adjusted such that the amount of suppression during the specific period Ts, which starts from a position based on the terminal end of the detected speech segment 51 and is a period shorter than a period spanning from the terminal end of the detected speech segment 51 to the starting end of the next speech segment 51, is greater than in other segments.

Moreover, in the present exemplary embodiment, the amount of suppression of noise is adjusted such that the amount of suppression is greater during the increased-suppression-amount segments Ts than in other segments due to further suppressing the noise in the noise suppressed signal s" during increased-suppression-amount segments Ts.

As explained above, in the present exemplary embodiment, noise is suppressed over the entire audio signal x, but the amount of suppression is increased for the increased-suppression-amount segments Ts rather than over the entire audio signal x. This prevents distortion from arising in the audio signal x due to excessively increasing the amount of suppression in the present exemplary embodiment. Namely, the recognition rate of the speech recognition block 44 at a later stage is prevented from being decreased by distortion arising in the audio signal x.

Moreover, in the present exemplary embodiment, the recognition rate of the speech recognition block 44 at a later stage is prevented from being lowered due to the amount of suppression for suppressing the noise not being high in the audio signal x. The power of speech by a user generally decreases as the terminal end of the speech is approached. Moreover, background noise is still present in non-speech segments 52, making it difficult to recognize terminal ends of speech, these being boundaries between speech segments 51 and non-speech segments 52.

If the amount of suppression here for suppressing noise in the audio signal x is not high, namely, is insufficient, then the difference between audio signals x in the speech segments 51 and audio signals x that are background noise in non-speech segments 52 becomes unclear due to residual noise. This makes it more difficult for the speech recognition block 44 to recognize terminal ends of speech, and lowers the speech recognition rate of the speech recognition block 44. According to the present exemplary embodiment, the recognition rate of the speech recognition block 44 can be prevented from being decreased since recognition of terminal ends of speech by the speech recognition block 44 is facilitated by increasing the amount of suppression for the increased-suppression-amount segments Ts.

Third Exemplary Embodiment

Figure 7:
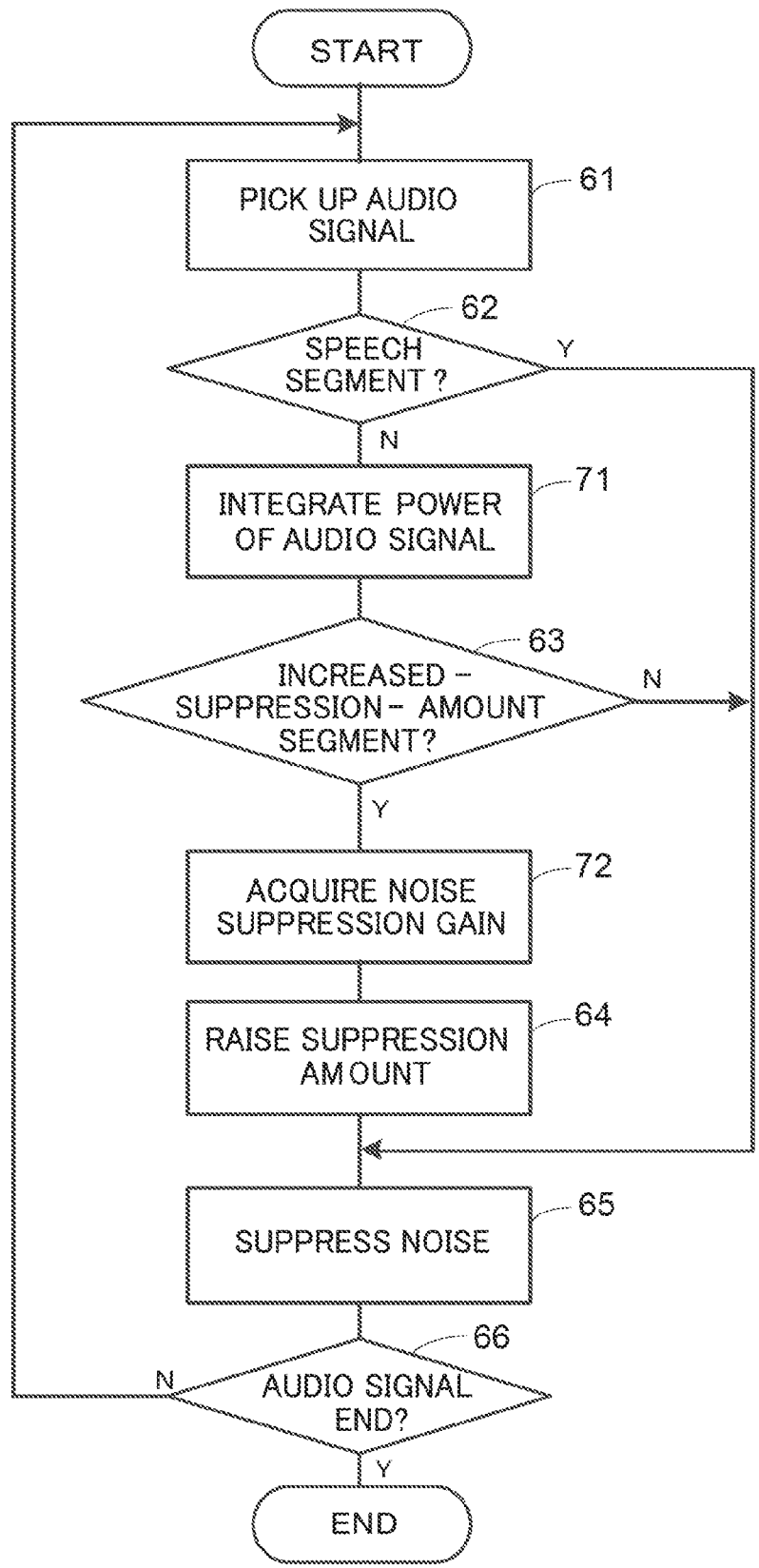
FIG. 7 is a flowchart illustrating an example of a flow of audio signal processing according to the third exemplary embodiment.

Next, explanation follows regarding a third embodiment, which is an example of an embodiment. Explanation regarding configuration and operation similar to those of the first exemplary embodiment is omitted. As illustrated by the example of FIG. 7, the third exemplary embodiment differs from the first exemplary embodiment in that, at step 71, the power of the audio signal x of a non-speech segment 52 is integrated, and at step 72, the suppression gain α is acquired based on an average value of the power of the audio signal x integrated at step 71.

In more detail, at step 62, in cases in which it is determined that the audio signal x is not a speech segment 51, namely, cases in which it is determined that the audio signal x is a non-speech segment 52, at step 71, the CPU 31 integrates one frame worth of the power of the audio signal x, $\Sigma x(t)^2$, with respect to time. The audio signal x is a background noise signal in non-speech segments 52.

In cases in which affirmative determination has been made at step 63, namely, cases in which it has been determined that the audio signal x is an increased-suppression-amount segment Ts, at step 72, the CPU 31 acquires the suppression gain α. For example, at step 71, an average value γ of the power of the audio signal x is found by dividing the total integrated power of the non-speech segment of the audio signal x by the total amount of time, and a value α corresponding to the average value γ in the graph illustrated in the example of FIG. 8 is acquired as the suppression gain α.

Figure 8:
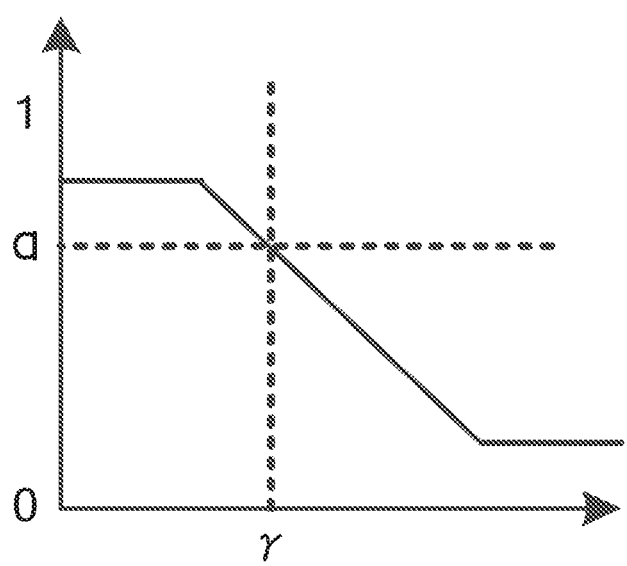
FIG. 8 is an illustrative diagram for explaining an example of an acquisition method for suppression gain according to the third exemplary embodiment.

In the graph illustrated in the example of FIG. 8, the vertical axis represents the value of the suppression gain, and the horizontal axis represents the average value of the power of the audio signal x of the non-speech segment 52. Note that the graph of FIG. 8 is merely an example and the present exemplary embodiment is not limited thereto.

The total power of the audio signal x integrated at step 71 and total time may, for example, be periodically reset. The total of the power of the audio signal x integrated by the audio signal processing performed earlier and the total amount of time may be employed, respectively, as the initial value of the power of the audio signal x integrated by the audio signal processing the current time and the total amount of time.

Although explanation has been given above regarding an example in which the processing of step 71 and step 72 is added to the processing of the first exemplary embodiment, the present exemplary embodiment may also be applied to the second exemplary embodiment. In cases in which the present exemplary embodiment is applied to the second exemplary embodiment, for example, step 71 may be included after step 62, and step 72 may be included after step 63.

In the present exemplary embodiment, noise in the audio signal x is suppressed. In the present exemplary embodiment, the amount of suppression is adjusted such that the amount of suppression during the specific period Ts, which starts from the position based on the terminal end of the speech segment 51 and is a period shorter than a period spanning from the terminal end of the speech segment 51 to the starting end of the next speech segment 51, is greater than in other segments.

As explained above, in the present exemplary embodiment, noise is suppressed over the entire audio signal x, but the amount of suppression is increased for the increased-suppression-amount segments Ts rather than over the entire audio signal x. This prevents distortion from arising in the audio signal x due to the amount of suppression being increased excessively in the present exemplary embodiment. Namely, the recognition rate of audio by the speech recognition block 44 at a later stage is prevented from being decreased by distortion arising in the audio signal x.

Moreover, the recognition rate of the speech recognition block 44 at a later stage is prevented from being lowered due to the amount of suppression for suppressing the noise in the audio signal x not being high in the present exemplary embodiment. The power of speech by a user generally decreases as the terminal end of the speech is approached. Moreover, background noise is still present in non-speech segments 52, making it difficult to recognize terminal ends of speech, these being boundaries between speech segments 51 and non-speech segments 52.

If the amount of suppression here for suppressing noise in the audio signal x is not high, namely, is insufficient, then the difference between audio signals x in the speech segments 51 and audio signals x that are background noise in non-speech segments 52 becomes unclear due to residual noise. This makes it more difficult for the speech recognition block 44 to recognize terminal ends of speech, and lowers the speech recognition rate of the speech recognition block 44. According to the present exemplary embodiment, the recognition rate of the speech recognition block 44 can be prevented from being decreased since recognition of terminal ends of speech by the speech recognition block 44 is facilitated by increasing the amount of suppression for the increased-suppression-amount segments Ts.

Moreover, in the present exemplary embodiment, the amount of suppression is adjusted such that the amount of suppression is increased during the increased-suppression-amount segments Ts according to an amount acquired based on the audio signal x of the non-speech segment 52. In the present exemplary embodiment, the amount of suppression is adjusted such that the amount of suppression during the increased-suppression-amount segments Ts is greater than in other segments by further suppressing the noise in the noise suppressed signal s'' during the increased-suppression-amount segment Ts by the amount acquired based on the audio signal x of the non-speech segment 52. This enables the amount of suppression during the increased-suppression-amount segment Ts to be appropriately adjusted in the present exemplary embodiment.

Fourth Exemplary Embodiment

Figure 9:
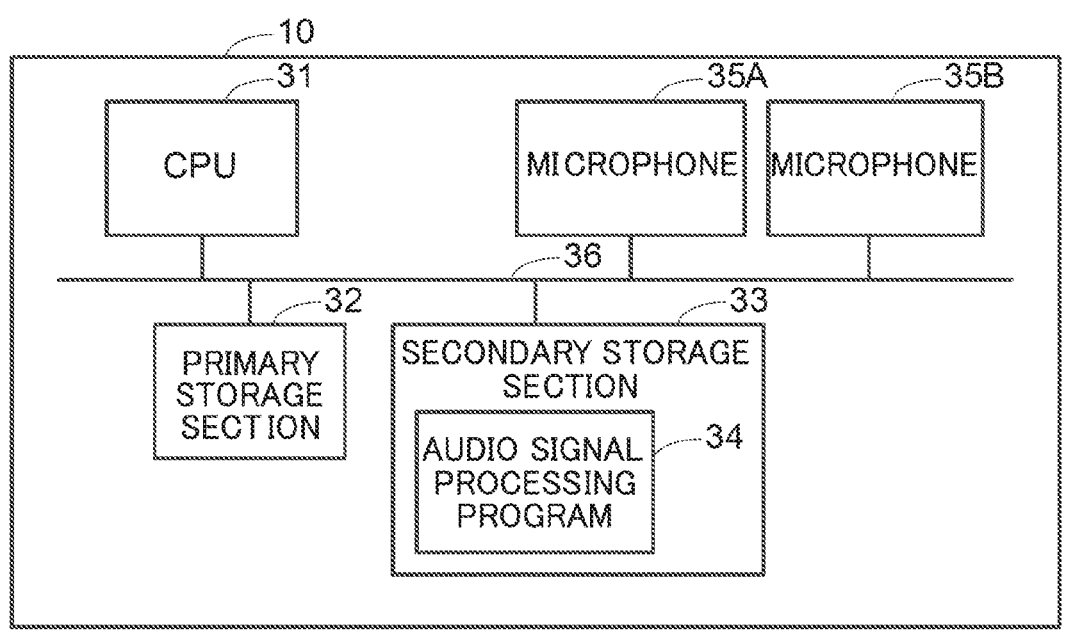
FIG. 9 is a block diagram illustrating an example of an electrical configuration of an audio signal processing device according to the fourth exemplary embodiment.

Next, explanation follows regarding a fourth embodiment, which is an example of an embodiment. Explanation regarding configuration and operation similar to those of the first exemplary embodiment are omitted. As illustrated by the example of FIG. 9, the fourth exemplary embodiment differs from the first exemplary embodiment in that a first microphone 35A and a second microphone 35B are included instead of the microphone 35. Note that the first microphone 35A and the second microphone 35B may be external microphones connected to the audio signal processing device 10 via a microphone terminal or the like.

Figure 10:
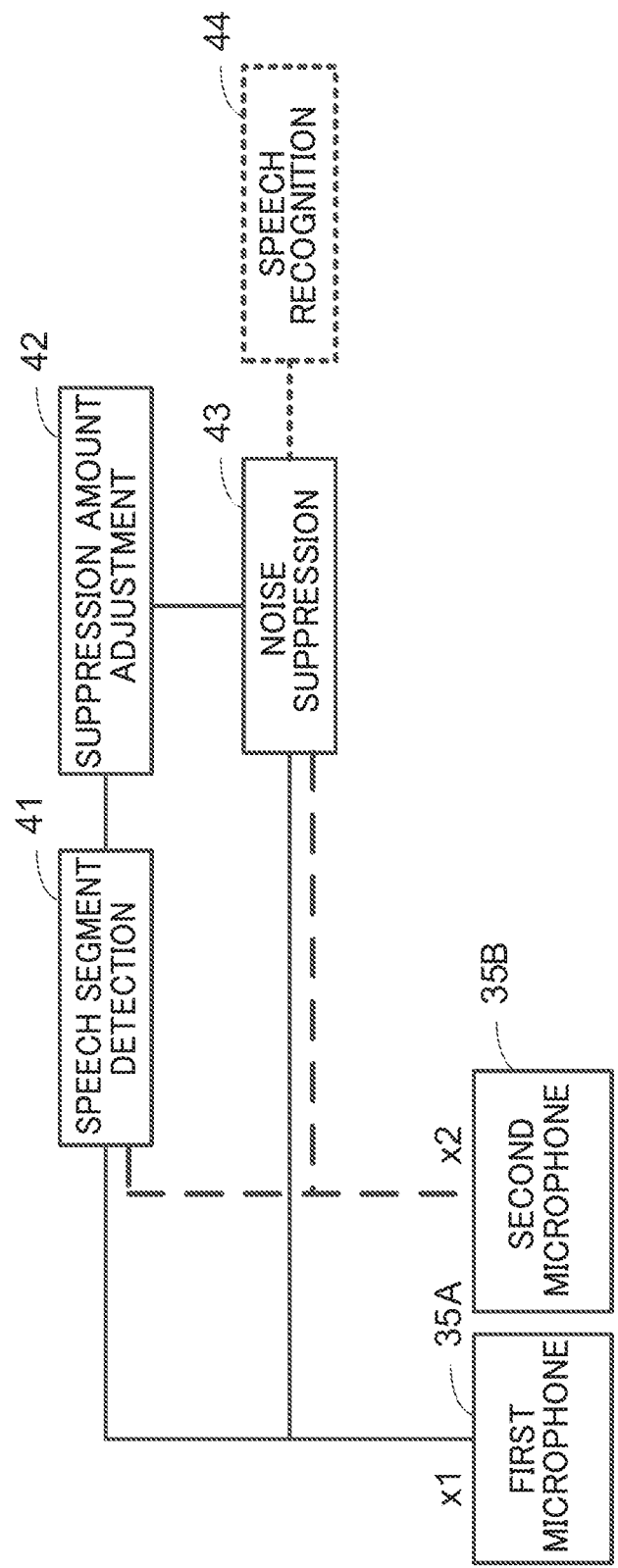
FIG. 10 is an illustrative diagram for explaining an example of audio signal processing according to the fourth exemplary embodiment.

Next, explanation follows regarding an outline of operation of the audio signal processing device 10. In the present exemplary embodiment, as illustrated by the example of FIG. 10, in block 43, the CPU 31 suppresses noise in an audio signal x1 corresponding to the audio picked up by the first microphone 35A and an audio signal x2 corresponding to the audio picked up by the second microphone 35B. The noise suppression may, for example, employ existing noise suppression technology such as technology in which noise suppression by filtering, noise suppression by spectral restoration, or the like for a single microphone is applied to plural microphones.

In block 41, the CPU 31 detects speech segments 51 based on relative values of the audio signal x1 and the audio signal x2. Moreover, the CPU 31 controls such that the amount of suppression of noise for the audio signal performed by block 43 during the increased-suppression-amount segments Ts is greater than the amount of suppression in segments other than the increased-suppression-amount segments Ts.

In more detail, at step 61 of FIG. 5, the CPU 31, for example, picks up one frame worth of the audio signal x1 corresponding to the audio picked up by the first microphone 35A and the audio signal x2 corresponding to the audio picked up by the second microphone 35B. At step 62, the CPU 31 determines whether or not the picked up audio signals x1 and x2 are audio signals of a speech segment 51.

The CPU 31, for example, calculates a relative value R between the audio signal x1 and the audio signal x2 using Equation (5).

$$R=\Sigma x1(t)x2(t-d)/(\Sigma x1(t)^2 \Sigma x2(t-d)^2)^{1/2} \qquad (5)$$

For example, suppose that the distance between the first microphone 35A and a sound source (for example, a driver in an automobile) is further than the distance between the second microphone 35B and the sound source. d is then a delay time matching the direction of the sound source. The CPU 31 determines a speech segment 51 in cases in which the relative value R is greater than a specific value.

Although explanation has been given above regarding an example in which there are two microphones, the present exemplary embodiment is not limited thereto. For example, there may be three or more microphones.

Moreover, although explanation has been given in the first exemplary embodiment regarding an example in which the microphone 35 is replaced by the first microphone 35A and the second microphone 35B, the present exemplary embodiment may also be applied to the second exemplary embodiment and the third exemplary embodiment.

In the present exemplary embodiment, noise is suppressed in the audio signal x1 and the audio signal x2. In the present exemplary embodiment, the amount of suppression is adjusted such that the amount of suppression during the specific period Ts, which starts from the position based on the terminal end of the speech segment 51 and is a period shorter than a period spanning from the terminal end of the speech segment 51 to the starting end of the next speech segment 51, is greater than in other segments.

As explained above, in the present exemplary embodiment, noise suppression is performed on the entirety of the audio signal x1 and the audio signal x2, but the amount of suppression is increased for the increased-suppression-amount segments Ts rather than over the entirety of the audio signal x1 and the audio signal x2. This prevents distortion from arising in the audio signal after noise suppression due to the amount of suppression being increased excessively in the present exemplary embodiment. Namely, the recognition rate of audio by the speech recognition block 44 at a later stage is prevented from being decreased by distortion arising in the audio signal after noise suppression.

Moreover, the recognition rate of the audio by the speech recognition block 44 at a later stage is prevented from being lowered due to the amount of suppression for suppressing the noise in the audio signal x1 and the audio signal x2 not being high in the present exemplary embodiment. The power of speech by a user generally decreases as the terminal end of the speech is approached. Moreover, background noise is still present in non-speech segments 52, making it difficult to recognize terminal ends of speech, these being boundaries between speech segments 51 and non-speech segments 52.

If the amount of suppression here for suppressing noise in the audio signal x1 and the audio signal x2 is not high, namely, is insufficient, then the difference between audio signals x1 and audio signals x2 of speech segments 51 and audio signals x1 and audio signal x2 that are background noise in non-speech segments 52 becomes unclear due to residual noise. It accordingly becomes more difficult for the speech recognition block 44 to recognize terminal ends of speech. This lowers the speech recognition rate of the speech recognition block 44. According to the present exemplary embodiment, the recognition rate for audio by the speech recognition block 44 can be prevented from being decreased since recognition of terminal ends of speech by the speech recognition block 44 is facilitated by increasing the amount of suppression for the increased-suppression-amount segments Ts.

Comparative Results Example

Detection rates for speech segments of an audio signal with the exemplary embodiments above applied and an audio signal with the exemplary embodiments above not applied were compared using 640 items of audio data recorded inside a travelling automobile. In the audio signal with the exemplary embodiments above applied, speech segments of the audio data were appropriately detected for all 640 audio signals out of the 640 items of audio data recorded in the travelling automobile. However, in the audio signal with the exemplary embodiments above not applied, appropriate detection of speech segment of the audio signal failed for 11 items of audio data out of the 640 items of audio data above.

For example, excessively suppressing noise gives rise to distortion in the audio, lowering the recognition rate of speech recognition at a later stage, and insufficient suppression of noise results in speech segments, these being segments in which a user speaks, not being appropriately detected, lowering the recognition rate of speech recognition at a later stage.

According to the present disclosure, noise in audio can be suppressed such that terminal ends of speech segments of audio can be appropriately determined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. An audio signal processing device comprising:
   a processor configured to execute a procedure, the procedure comprising:
   detecting a speech segment of a first audio signal;
   suppressing noise in the first audio signal;
   transforming the first audio signal to a second audio signal by suppressing noise by adjusting an amount of suppression of noise such that the amount of suppression during a specific period, which starts from a position based on a terminal end of the detected speech segment and is a period shorter than a period spanning from the terminal end of the detected speech segment to a starting end of a next speech segment, becomes greater than in other segments, and
   outputting the second audio signal to a speech recognition section that performs speech recognition processing, and
   a memory configured to store audio signals before and after noise suppression and the amount of suppression before and after adjustment.

2. The audio signal processing device of claim 1, wherein the amount of suppression during the specific period is adjusted so as to increase according to an amount acquired based on the first audio signal in a non-speech segment between the detected speech segment and the next speech segment.

3. The audio signal processing device of claim 1, wherein:
   the amount of suppression is adjusted so as to be greater during the specific period than in other segments by further suppressing noise in the noise-suppressed audio signal during the specific period, according to an amount acquired based on the first audio signal in a non-speech segment between the detected speech segment and the next speech segment; and
   noise in the noise-suppressed audio signal is further suppressed during the specific period.

4. The audio signal processing device of claim 1, wherein the procedure further comprises:
   inputting the first audio signal using a plurality of audio input sections; and
   detecting the speech segment based on a relative value between audio signals that correspond to audio picked up by each of the plurality of audio input sections.

5. An audio signal processing method comprising, by a processor:
   detecting a speech segment of a first audio signal;
   suppressing noise in the first audio signal;
   transforming the first audio signal to a second audio signal by suppressing noise by adjusting an amount of suppression of noise such that the amount of suppression during a specific period, which starts from a position based on a terminal end of the detected speech segment and is a period shorter than a period spanning from the terminal end of the detected speech segment to a starting end of a next speech segment, becomes greater than in other segments; and
   outputting the second audio signal to a speech recognition section that performs speech recognition processing.

6. The audio signal processing method of claim 5, wherein the amount of suppression during the specific period is adjusted so as to increase according to an amount acquired based on the first audio signal in a non-speech segment between the detected speech segment and the next speech segment.

7. The audio signal processing method of claim 5, wherein:
   the amount of suppression is adjusted so as to be greater during the specific period than in other segments by controlling such that, during the specific period, noise is further suppressed in the noise-suppressed audio signal, according to an amount acquired based on the first audio signal in a non-speech segment between the detected speech segment and the next speech segment; and
   noise in the noise-suppressed audio signal is further suppressed during the specific period.

8. The audio signal processing method of claim 5, wherein:
   the speech segment is detected based on relative values between audio signals corresponding to audio picked up by a plurality of audio input sections.

9. A non-transitory recording medium storing a program that causes a computer to execute audio signal processing, the audio signal processing comprising:
   detecting a speech segment of a first audio signal;
   suppressing noise in the first audio signal;
   transforming the first audio signal to a second audio signal by suppressing noise by adjusting an amount of suppression of noise such that the amount of suppression during a specific period, which starts from a position based on a terminal end of the detected speech segment and is a period shorter than a period spanning from the terminal end of the detected speech segment to a starting end of a next speech segment, becomes greater than in other segments; and
   outputting the second audio signal to a speech recognition section that performs speech recognition processing.

10. The non-transitory recording medium of claim 9, wherein the amount of suppression during the specific period is adjusted so as to increase according to an amount acquired based on the first audio signal in a non-speech segment between the detected speech segment and the next speech segment.

11. The non-transitory recording medium of claim 9, wherein:
    the amount of suppression is adjusted so as to be greater during the specific period than in other segments by controlling such that, during the specific period, noise is further suppressed in the noise-suppressed audio signal, according to an amount acquired based on the first audio signal in a non-speech segment between the detected speech segment and the next speech segment; and
    noise in the noise-suppressed audio signal is further suppressed during the specific period.

12. The non-transitory recording medium of claim 9, wherein the audio signal processing further comprises:

detecting the speech segment based on relative values between audio signals corresponding to audio picked up by a plurality of audio input sections.

\* \* \* \* \*